Oct. 27, 1970  D. SINKLER  3,536,295
BALANCED SLEEVED PLUG VALVE OR COCK
Filed Aug. 23, 1967 2 Sheets-Sheet 1

INVENTOR.
DEAS SINKLER
BY
J Warren Kinney Jr
ATTORNEY

Oct. 27, 1970　　　D. SINKLER　　　3,536,295
BALANCED SLEEVED PLUG VALVE OR COCK
Filed Aug. 23, 1967　　　2 Sheets-Sheet 2
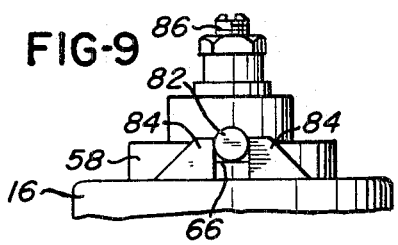
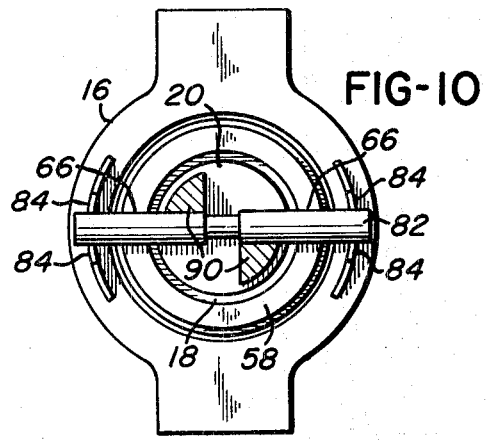
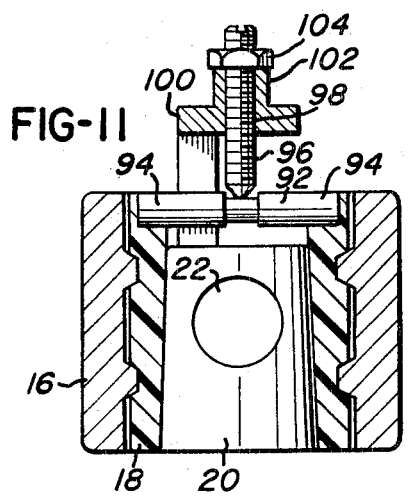
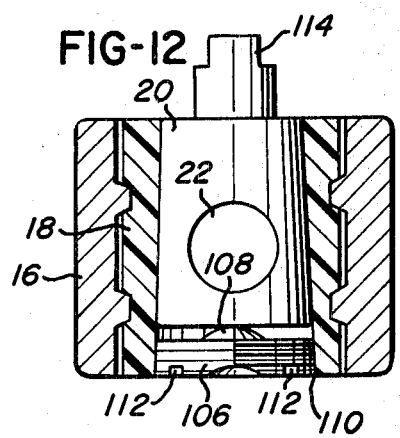
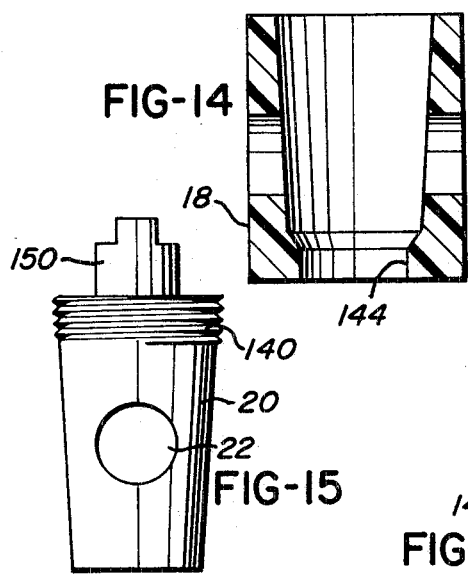
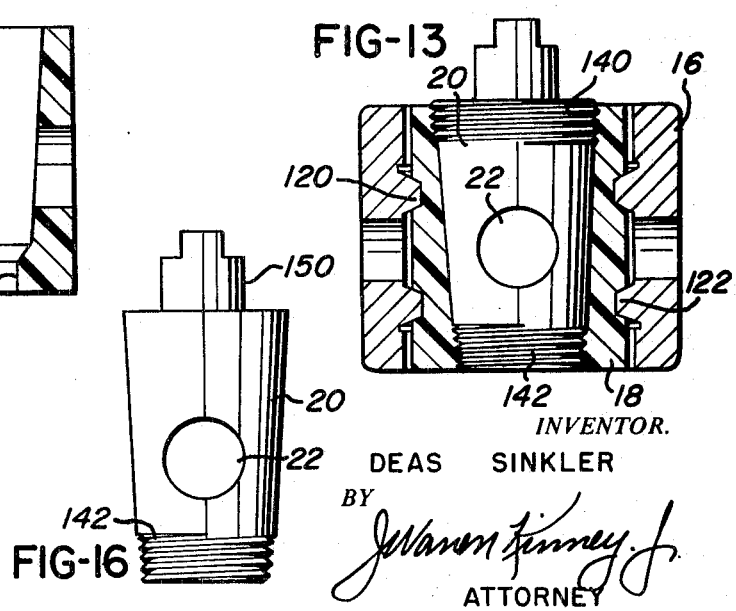
INVENTOR.
DEAS SINKLER
BY
J. Warren Kinney Jr.
ATTORNEY United States Patent Office 3,536,295
Patented Oct. 27, 1970

3,536,295
BALANCED SLEEVED PLUG VALVE OR COCK
Deas Sinkler, 2552 S. Taylor Road,
Cleveland, Ohio 44118
Filed Aug. 23, 1967, Ser. No. 662,810
Int. Cl. F16k 5/16
U.S. Cl. 251—164                                        40 Claims

ABSTRACT OF THE DISCLOSURE

A balanced sleeve-lined plug valve in which a sleeve is secured to and carried by the body bore and wherein a rotatable plug is secured against longitudinal displacement from the sleeve by means connecting the plug to the sleeve rather than to the valve body.

---

This invention relates to a balanced sleeved plug valve, or cock, for controlling the flow of fluids, including those of a corrosive nature. A primary object of the present invention is to provide a pressure balanced sleeved plug valve of highly simplified construction, featuring a desirable reduction in the number of constituent parts employed in constructing the valve.

Another object of the invention is to substantially reduce the cost of producing a highly serviceable sleeved plug valve, utilizing simple and inexpensive constituent parts which are easily and quickly assembled.

Another object is to provide a valve of the character stated, which is balanced to avoid any tendency of fluid pressure to loosen or unseat the plug, the means for this purpose being simple, inexpensive, and reliable of performance.

A further object of the invention is to provide a valve having the advantages above mentioned, which is capable of controlling flow of fluids without leakage.

Another object is to provide a valve of the character stated, which can effectively control flow of fluids having corrosive characteristics, or other characteristics know to have damaging effects upon flow control valves generally.

Still another object is to so construct a plug valve, that no bonnet, adjusting gland or cover having connection with the valve body is needed to hold the plug in seated position, or to provide for seating adjustments.

A further object of the invention is to provide a pressure balanced sleeved plug valve wherein the sleeve is securely anchored to and carried by the body bore, and wherein the sleeve is, by reason of its association with said bore, provided with high pressure sealing areas which circumscribe the flow ports of the valve body, and high pressure sealing areas which circumscribe the bore of the valve body above and below the aforesaid flow parts.

Still a further object of the invention is to provide a valve having characteristics as described in the preceding paragraph, and which includes a plug rotatably supported within the bore of the sleeve in such manner as to avoid generating any force tending to produce endwise or axial movement of the sleeve relative to the valve body.

Another object is to provide a sleeved plug valve wherein the sealing pressure between the plug and the sleeve is increased incident to rotation to the plug to shut-off position.

Another object is to provide a sleeved plug valve which includes means operative incident to rotation of the plug to shut-off position, for decreasing the esaling pressure between the plug and the sleeve in which the plug rotates.

Another object of the invention is to provide a balanced sleeved plug valve having the hereinabove described characteristics and including adjusting means carried by the plug to act upon the sleeve, or adjusting means carried by the sleeve to act upon the plug, for imparting endwise adjustment to the plug relative to the sleeve.

The foregoing and other objects are attained by the means described herein and illustrated upon the accompanying drawings, in which:

FIG. 9 is a side elevation taken on line 9—9 of FIG. 8.

FIG. 10 is a cross-sectional view taken on line 10—10 of FIG. 8.

FIG. 11 is a vertical cross-section similar to FIG. 5, showing a modification thereof.

FIG. 12 is a view similar to FIG. 1, showing a further modification thereof.

FIG. 13 is a vertical cross-section, partly broken away, and showing still another modification.

FIG. 14 is a vertical cross-section of a liner applicable to FIG. 13.

FIG. 15 is a side elevation of a valving member or plug which may be substituted for the plug of FIG. 13.

FIG. 16 is a side elevation showing a modified form of the valving member or plug illustrated by FIGS. 13 and 15.

Figure 1:
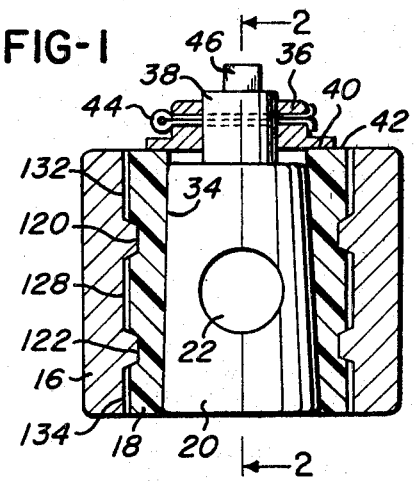
FIG. 1 is a vertical cross-section of an assembled plug valve constructed according to the present invention.

In the several drawing views, 16 indicates a valve body member in which a tubular sleeve or liner 18 is supported, the sleeve in turn being receptive of a tapered rotational valving member or plug 20. The valving member or plug is provided with a transverse opening 22 providing a flow passage, to be rotated with the plug for registry with the flow passages or ports 24 and 26 of the valve body member. Tubular liner 18, which is stationary within the base of the hollow body member 16, has flow passages or openings 28 and 30 fixed in registry with ports 24 and 26, respectively, of the valve body member.

When the valving member or plug 20 (FIG. 2), is rotated to align its flow passage 22 with the flow passages of the liner and the body member, the valve may be said to be in open position. A quarter-turn of the plug, of course, displaces the passage 22 from registry with the flow passages of the body member and the sleeve or liner, to close the valve against flow of fluid therethrough.

Sleeve 18 may be in the form of a resilient tube anchored within the bore 32 of the valve body, and adapted to embrace substantially the full length of the smooth bearing surface of plug 20. The inner wall or bore 34 of the sleeve is smooth, and tapered in substantial conformity with the taper of the plug as shown.

Figure 2:
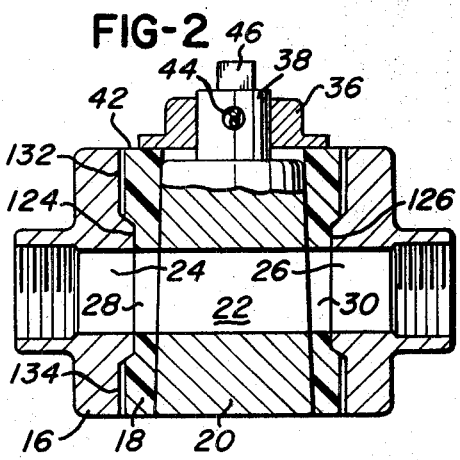
FIG. 2 is a cross-section taken on line 2—2 of FIG. 1.

It is important to note that the plug is drawn into seating engagement with the tapered inner wall of the liner, by means of a load bearing member or thrust member 36 carried by plug 20 and having no connection with the body member of the valve. In FIGS. 1 and 2, for example, the member 36 may be in the form of a centrally apertured washer encircling the stem 38 of the plug, and having a circumferential bearing at 40 upon one end face 42 of the liner. The washer or thrust member 36 may be held against the liner end face in any suitable manner, as by means of a cotter pin 44 passing through holes formed in the plug stem and the body of the washer, as shown. If desired, the washer and the stem may have a screw-threaded connection one upon the other, thereby rendering adjustable the force with which the washer bears upon the end face of the liner or sleeve. In the FIG. 1 construction, bearing pressure between washer 36 and the end portion 42 of the sleeve, may be varied by interposing suitable shims at the bearing area.

It should be noted that the means of FIGS. 1 and 2 for maintaining a desired seating pressure between the plug and the inner wall of the sleeve, is assembled entirely and completely upon the plug, thereby to eliminate the need for any bonnet or cover secured upon the body 16 of the valve. Thus, with the body bore substantially cylindrical, as shown, the forces tending to shift the liner-valve plug assembly axially of the valve body are in equilibrium, whether or not the plug is adjustable axially to regulate seating pressure within the liner. The construction of the valve thereby is greatly simplified, and assembly is facilitated and expedited, with substantial savings of time, labor and materials realized.

The reference character 46 indicates a flattened portion on the end of the plug stem, to facilitate application of a wrench or tool for rotating the valving member or plug 20.

Figure 4:
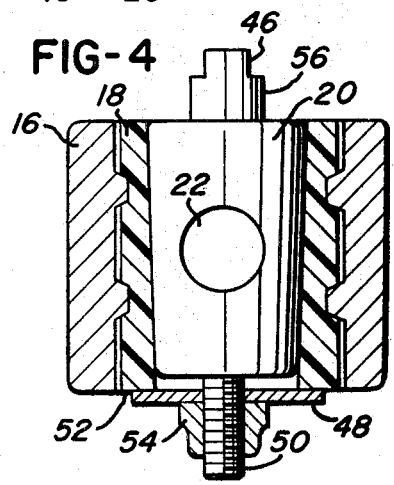
FIG. 4 is a cross-sectional view like FIG. 1, showing a first modification.

Referring now to FIG. 4, the means for drawing the plug into seating engagement with sleeve 18 is shown as a washer or thrust member 48 encircling a fixed threaded stud 50 anchored in the reduced end of the plug, the washer or thrust member being held against an end face 52 of the sleeve by means of a nut 54 threaded onto the stud. In this instance, the operating stem 56 of the plug is located at the larger end of the tapered plug. As in FIG. 1, the washer or thrust member 48 has no bearing contact upon the body member 16 of the valve.

Figure 6:
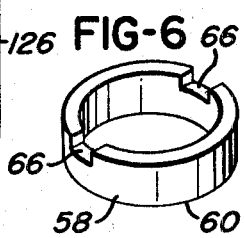
FIG. 6 is a detail view of a pressure-transmitting member or head used in the FIG. 5 construction.
Figure 5:
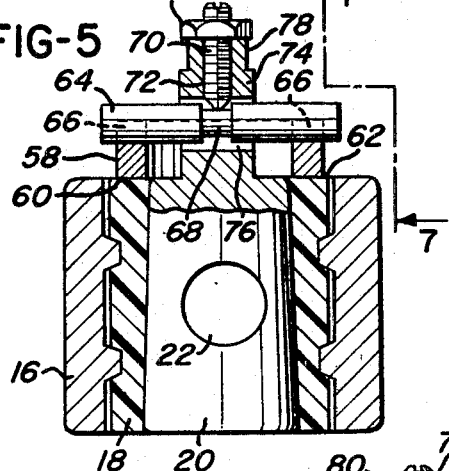
FIG. 5 is a vertical cross-section showing a second modification of the valve.
Figure 7:
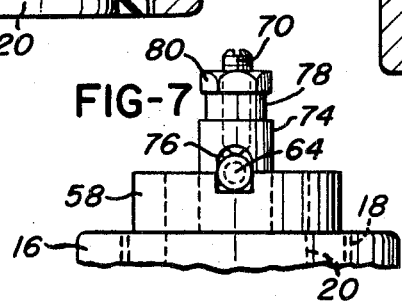
FIG. 7 is a side elevational view taken on line 7—7 of FIG. 5.

FIGS. 5, 6 and 7 illustrate a modification in which the load bearing member or thrust member 58 is in the form of a ring or tubing section, having a lower peripheral end face 60 to bear upon the end face 62 of the sleeve. The ring is projected against the liner end by means of a cross bar 64, which spans the ring diametrically, while opposite end portions of the cross bar rest within the notches 66 formed upon the ring. Downward force is applied to the middle portion 68 of the cross bar, by an adjusting set screw 70 having screw-threaded connection at 72 with the top portion 74 of the plug stem. The stem in this instance is provided with a transverse elongate slot 76 to shiftably accommodate cross bar 64, so that by advancing the adjusting screw 70, the thrust member or ring 58 will be forced against the bearing face 62 of the liner to lift the valve plug into seating contact with the inner wall of the sleeve.

The reference character 78 indicates wrench flats on the upper end of plug stem 74. A lock nut 80 applied to screw 70 serves to secure a wrench for rotating the valve plug as well as preventing rotation of adjusting screw 70. As will be understood, ring or thrust member 58 will glide upon liner end face 62 as the plug is rotated.

Figure 8:
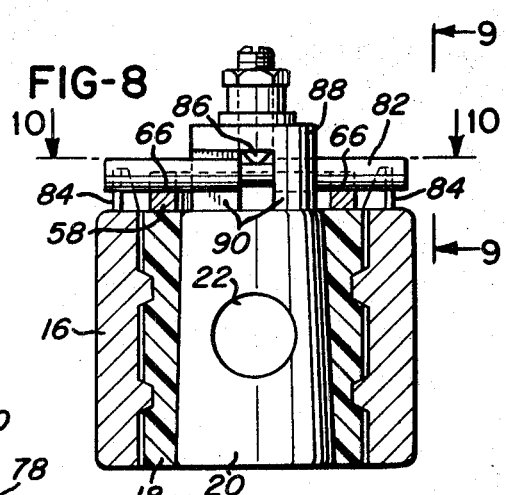
FIG. 8 is a vertical cross-section showing a modification of the FIG. 5 construction.

FIGS. 8, 9 and 10, illustrate a modification of the valve wherein is provided means for limiting rotation of the valving element or plug to open and closed valve positions. In this construction, cross bar 82 is of sufficient length to overlie liner 18 and adjacent portions of the valve body 16. The body may be provided with opposed fixed stops 84, 84, to engage the end portions of cross bar 82 and thereby preclude rotation of the cross bar with plug 20. A thrust member or load bearing element or ring 58 bears upon the upper end face of sleeve 18, with a degree of force determined by advancement of adjusting screw 86, in precisely the manner explained in the description of FIG. 5.

The reduced end of tapered plug 20 carries an integrally formed bridge 88 drilled and tapped axially of the plug, to threadedly receive the adjusting screw 86. Thus, the leading end of the screw may engage the middle relieved portion of cross bar 82, to force the ring 58 against the adjacent end of liner 18 without applying any force against valve body 16.

It will be noted that bridge 88 includes a pair of diametrically opposed posts 90, 90, (FIG. 10), each serving as a limit stop to abut cross bar 82, as the valve plug is rotated in opposite directions through an arc of about ninety degrees. That is, posts 90—90 turn with the plug, while cross bar 82 remains stationary and limits rotation of the plug. The ring or thrust member 58 is locked to cross bar 82 at notches 66, so that plug 20 rotates within sleeve 18 while ring 58 remains stationary. The ring, however, applies compressive force to the sleeve in the direction of the sleeve axis.

FIG. 11 illustrates a construction in which the thrust member comprises a cross bar 92 having opposite end portions 94 bearing directly upon an end of the sleeve, diametrically of the sleeve, the cross bar being forced against the sleeve end by means of an adjusting screw 96. The end portions 94 of the cross bar may be more or less embedded in the material of the sleeve as suggested by FIG. 11, if desired. Screw 96 may be threadedly mounted at 98, upon a bridge member 100 formed integrally upon the reduced end of plug 20 so as to overlie the plug end. The numeral 102 denotes wrench flats integral with member 100. A lock nut 104 may be applied to the adjusting screw as shown and as described with reference to lock nut 80 of FIGS. 5 and 7.

In FIG. 12, a different form of means is employed to maintain the valve plug 20 in seated relationship with the tapered inner wall of sleeve 18. Such means may comprise a load bearing member or thrust member in the form of an externally threaded plug or disc 106, having a central protuberance 108 to bear against the enlarged end of the tapered valve plug axially thereof. The threaded disc 106 may be properly sized so as to be self-threading within the lower open end 110 of liner 18, to an extent necessary for obtaining a required seating pressure of plug 20 within the liner. The reference characters 112 indicate recesses in member 106 to accommodate a spanner wrench, for adjusting the seating pressure aforesaid. The valve plug may be rotated by means of stem 114, as is usual.

Attention is directed to the nature of sleeve 18 in all forms of the invention herein disclosed. It is highly desirable that the sleeve be formed of a low-friction plastic material from the group consisting of polyethylene and derivatives thereof having relative high coefficients of thermal expansion such as, by way of example, polytetrafluroethylene commercially available under the name of Teflon. The sleeve may be applied to the bore of the valve body member in accordance with the teaching of my U.S. Pat. 3,061,269 wherein are established high pressure sealing areas and areas of reduced pressure in the sleeve or sealing member and locking the sleeve against rotation and axial movement.

Figure 3:
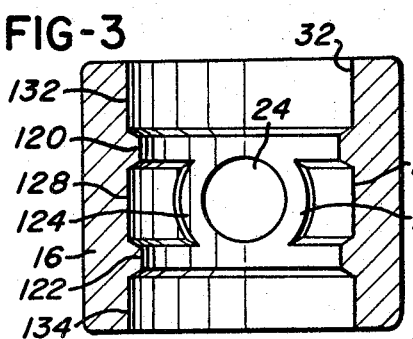
FIG. 3 is a view similar to FIG. 1, showing the valve body with the plug and liner removed.

In the present disclosure, FIGS. 1, 2 and 3 may be considered for the purpose of illustrating and explaining the presence of high pressure sealing areas and areas of reduced pressure in the structure of the valve. FIG. 3 shows the valve body member in cross-section, prior to insertion of sleeve 18. It will be noted that in general, the bore 32 may be substantially cylindrical, except for the presence of inwardly projecting ribs formed therein. Inwardly projecting ribs 120 and 122 extend annularly inwardly toward the valve body axis, in planes which are normal to said axis, and which planes are located above and below the ports 24 and 26. Said ribs 120 and 122 are tangent to the ports 24 and 26.

About the ports 24 and 26, transverse ribs 124 and 126 connect with the ribs 120 and 122, to provide a reinforcement of body material contiguous to and completely surrounding each of the ports 24 and 26. All of the ribs 120, 122, 124 and 126 are preferably spaced equal distances from the axis of bore 32.

Incident to formation of the ribs mentioned above, relief areas 128 and 130 are produced, these relief areas being defined as to length by the transverse ribs 124 and 126. The width of each relief area is defined by the annular ribs 120 and 122. It should be understood that the ends of relief area 128 terminate near ports 24 and 26, and the ends of relief area 130 likewise terminate near ports 24 and 26; however, the relief area ends fail to reach the ports by reason of the presence of ribs 124 and 126.

From the annular rib 120 upwardly, (FIG. 3), the bore of the valve body is increased in diameter to provide an endmost annular relief area 132. Similarly, a second endmost annular relief area 134 is formed downwardly of rib 122. Relief areas 132 and 134 may be of approximately the same depth as relief areas 128 and 130. It may here be noted that port 24 is completely surrounded by ribs 124 and 126, and adjacent portions of ribs 120 and 122, to thicken the body material uniformly about port 24. The same applies also to port 26, which may be directly opposite to port 24.

In the process of lining the bore 32, a substantially tubular sleeve of Teflon or the like is inserted in bore 32, and then expanded toward the ribs and relief areas of FIG. 3, until the sleeve envelops the ribs and nearly fills the relief areas as indicated by FIGS. 1 and 2. Such placement of the sleeve may be performed by a press operation, as fully explained in my issued patent aforesaid.

It should be clearly understood by referring to FIG. 1, that the installed sleeve 18 will be more densely compacted at the ribs 120, 122, than at the relief areas 128, 132 and 134. Also, the density of the sleeve material will be increased atop the ribs 124 and 126 of FIG. 3, about ports 24 and 26. This is especially evident when plug 20 is in place.

The areas of greatest density or compaction of the sleeve, are regarded as "high pressure areas"; and those areas where the sleeve material enters the several relief areas 128, 132 and 134, are regarded as "areas of reduced pressure." The detailed method of producing the said high pressure and reduced pressure areas, is thoroughly disclosed and explained in my aforesaid issued patent, along with the advantages thereof. It may here be mentioned that the ribs and relief areas of the valve body preclude shifting of the sleeve both axially and rotationally.

It is to be noted that the tapered plug or valving member 20 is forced to seating position within the correspondingly tapered sleeve, with the use of means applying a counter-force to one end face of the liner itself. Such means is very simple and effective, and results in eliminating expensive bonnets or covers which heretofore required assembly upon the valve body member at considerable expense, and with a much greater expenditure of time and labor. Furthermore, no amount of vibration of fluid pressure can be effective upon the valve to displace the parts and cause leakage.

The modification of FIGS. 13 to 16 inclusive, features the areas of high pressure and reduced pressure above mentioned, and employs the absolute minimum number of parts, namely, a body 16, a liner 18, and a valving member or plug 20. In accordance with FIG. 13, the tapered plug 20 carries at its upper and lower ends the screw threads 140 and 142, which forcefully engage the sleeve material at the upper and lower ends of the sleeve, to advance the plug into the sleeve upon rotation of the plug, and to furnish effective fluid-tight seals at the threads. The material of the sleeve may be the same material that is used in the preceding drawing figures.

In FIG. 13, the threads 140 and 142 are shown as right-hand threads, so that advancement of the plug into the sleeve results from clockwise rotation of the plug. Such advancement also progressively increases the sealing pressure of the plug within the sleeve. Upon attainment of a desired sealing pressure, the plug may be rotated in opposite directions within 90-degree limits, to place the plug port 22 in and out of registry with the inlet and outlet ports of the valve body. These limits may be established by means of stop lugs carried by the valve body, in conventional manner if desired.

The lower thread 142 may be cut into the material of the valve plug, whereas the upper thread 140 may be applied as a rolled thread in order to extend the crest thereof outwardly beyond the tapered face of the plug. If desired, the root of thread 140 may be depressed into the plug material approximately the same distance that the crest thereof extends outwardly beyond the tapered face of the plug.

The deformable sleeve 18, prior to press-forming within the valve body, may have the characteristics illustrated by FIG. 14. The sleeve outer wall is substantially cylindical, whereas the inner tapered wall is thickened at the lower end to provide a bore 144 of reduced diamter substantially less than the diameter of plug 20 at its thread zone at 142. When the FIG. 14 sleeve is inserted into valve body 16 and pressure-expanded against ribs 120 and 122 as previously explained, the thickened portion at 144 will present a somewhat reduced diameter bore of high density material into which the thread 142 may bury itself as plug 20 is rotated into the sleeve, thereby to provide a fluid-tight seal at the thread. A second fluid-tight seal simultaneously may be produced at the upper end of the sleeve and plug, as the thread 140 buries itself similarly in the material of the sleeve. The threads 140 and 142 preferably are smooth or polished.

In constructing the valve of FIG. 13, the plug may be provided with a thread at the upper end only, according to FIG. 15, or at the lower end only, according to FIG. 16, if desired. The threads may be cut into the material of the plug, or rolled on as previously stated. The stem 150 may be located at the top of the plug, or at the lower reduced end, as desired.

It may sometimes be considered advantageous to form the threads as left-hand threads, rather than right-hand threads. The left-hand thread may advantageously be employed when the valve is to be used under certain conditions wherein upon rotating the plug to closed valve position, the plug may be slightly loosened within the sleeve to avoid excessive binding. When the threads 140-142 of the plug are right-hand threads, the plug may be adavnced into the tapered sleeve incident to rotation to shut-off position, thereby to effect greater sealing pressure within sleeve 18. This is particularly important in valves used for handling fluids at an elevated temperature which subsequently cools when flow is stopped. The preferred sleeve material may have a greated linear thermal coefficient of expansion than that of the plug and/or body materials. The aforesaid greater sealing pressure achieved upon rotation of the plug to shut-off position may partially or completely serve to compensate for the relatively greater shrinkage of the sleeve member upon cooling of the valve assembly from the elevated temperature.

From the foregoing it will be apparent that the annulus between the plug and the valve body may be either increased or decreased, depending upon the hand of the thread, and the direction of valve plug rotation.

The pressure of contact of the plug within the sleeve may be very simply adjusted at any time, by merely turning the plug to overrun the plug stops in either the advancing or retracting direction of rotation. The pitch of threads 140 and 142 may approximate twenty to thirty threads to the inch, by preference.

The valve of FIGS. 12 through 16 employs a minimum number of simple and inexpensive parts, and may easily be adjusted or serviced when necessary. This valve accordingly may be manufactured and sold at very low cost, and is capable of performing highly satisfactory and reliable service. The sleeve itself is its own anti-friction member in all cases.

What is claimed is:

1. A sleeved valve of the rotary plug type, comprising in combination: a body member having a bore therethrough, said body member having an inlet port and an outlet port; a substantially tubular sleeve mounted in the body member bore, said sleeve having an end portion, an inner frusto-conical wall, and a pair of openings in registry with the ports of the body member; a rotary valving member in the form of a plug having an outer frusto-conical surface tapered substantially complementarily with the taper of the inner wall of the sleeve, said plug having a through passage formed therein to register with the sleeve openings and the inlet and outlet ports of the body member upon partial rotation of the plug; and means applying opposed constantly balanced forces acting axially upon the plug and the sleeve end portion, for maintaining the plug in adjustable pressure sealing contact with the inner wall of the sleeve.

2. The valve as specified by claim 1, wherein the sleeve is of one-piece preformed construction, and substantially coextensive in length with the length of the outer wall of the plug.

3. The valve as specified by claim 2, wherein the sleeve extends approximately from one end to the other end of the outer wall of the plug.

4. The valve as specified by claim 1, wherein the last-mentioned means comprises a thrust member in abutment against the sleeve end portion, and means carried by the plug for driving said thrust member against said sleeve end portion.

5. The valve as specified by claim 4, wherein said driving means is adjustable as to the force applied thereby to said thrust member.

6. The valve is specified by claim 4, wherein the sleeve end portion is partially yieldable to the driving force transmitted thereto by said thrust member.

7. The valve as specified by claim 5, wherein the sleeve end portion has limited yieldability to the driving force transmitted thereto by said thrust member, in a direction axially of the plug.

8. The valve as specified by claim 4, wherein the combination includes means for limiting rotation of the plug in opposite directions about the plug axis.

9. The valve as specified in claim 1, wherein the last-mentioned means comprises a thrust member mounted upon the sleeve, and in contact with an end of the plug.

10. The valve as specified by claim 9, wherein the thrust member is adjustable axially of the sleeve.

11. A valve comprising a body member, a valving member, and a sleeve member having an end portion, said sleeve member formed of a deformable material having a low coefficient of friction and which is substantially resistant to corrosives and solvents, each of said members including flow passages; means mounting said valving member for movement relative to said body member to place the flow passages of said valving member in and out of communication with the flow passages of said body member, said sleeve member being interposed between said valving and body members; means integral with said body member for simultaneously producing high pressure areas in the sleeve member completely and continuously surrounding the flow passages of said body, valving, and sleeve members in all positions of said valving member, and locking said sleeve member against movement with respect to the member containing said means; and means applying constantly balanced forces axially upon the valving member and an end portion of the sleeve member, for securing the valving member in adjustable pressure sealing contact with the sleeve member.

12. The valve as specified by claim 11, wherein the aforesaid high pressure areas are surrounded by areas of reduced pressure to accommodate portions of the lining member incident to expansion and contraction thereof.

13. The valve as specified by claim 12, wherein the sleeve member is of one-piece construction, and substantially surrounds the valving member at the high pressure and reduced pressure areas aforesaid.

14. The valve as specified by claim 13, wherein the sleeve member is formed of a fluorinated hydrocarbon.

15. The valve as specified by claim 11, wherein the last-mentioned means comprises a thrust member in abutment against an end portion of the sleeve member; and means carried by the valving member for driving said thrust member against the said end portion of said sleeve member.

16. The valve as specified by claim 15, wherein said driving means is adjustable as to the force applied thereby to said thrust member.

17. The valve as specified by claim 15, wherein an end portion of the sleeve member has limited yieldability to the driving force transmitted thereto by said thrust member, in a direction axially of the valving member.

18. The valve as specified by claim 15, wherein the combination includes means for limiting axial rotation of the valving member in opposite directions.

19. The valve as specified by claim 11, wherein the last-mentioned means comprises a thrust member mounted upon the sleeve member, and in contact with an end of the valving member.

20. The valve as specified by claim 19, wherein the thrust member is adjustable axially relative to the sleeve member.

21. A sleeved valve of the rotary plug type, comprising in combination: a body member having a bore therethrough, said body member having an inlet port and an outlet port; a substantially tubular deformable sleeve fixedly mounted in the body bore, said sleeve having opposite end portions, an inner frusto-conical wall, and a pair of openings in register with the ports of the body member; a rotary valving member in the form of a plug having opposite end portions and an outer frusto-conical surface tapered substantially complementarily with the taper of the inner wall of the sleeve, said plug having a through passage formed therein to register with the sleeve openings and the inlet and outlet ports of the body member upon partial rotation of the plug; and means applying opposed constantly balanced forces acting axially upon the plug and the sleeve end portion, for maintaining the plug in adjustable pressure sealing contact with the inner wall of the sleeve, and means comprising a screw thread on one end portion of the frusto-conical plug surface and self-threaded into the deformable material of the sleeve incident to rotation of the plug in one direction.

22. The valve as specified by claim 21, wherein said screw thread has the crest thereof extended outwardly beyond the frusto-conical surface of the plug.

23. The valve as specified by claim 22, wherein the plug has a second screw thread formed on the opposite end portion of the tapered plug wall for self-threading into the deformable material of the sleeve, said sleeve in the region of contact with said second screw thread being constricted in inside diameter to enforce self-threading of said second screw thread into the material of the sleeve upon rotation of the plug.

24. The valve as specified by claim 23, wherein said second screw thread has its crest substantially flush with the frusto-conical outer surface of the plug.

25. The valve as sepcified by claim 24, wherein the material of the sleeve in the region of contact with the second screw thread, is of increased density over the density of the sleeve material in the region of contact with the first mentioned screw thread.

26. The valve as specified by claim 21, wherein the sleeve is formed of a fluorinated hydrocarbon material.

27. The valve as specified by claim 23, wherein the sleeve is formed of a fluorinated hydrocarbon material.

28. The valve as specified by claim 21, wherein the screw thread is a left-hand thread.

29. The valve as specified by claim 23, wherein the screw threads of the plug are left hand threads.

30. The valves as specified by claim 21, wherein the screw thread mentioned has its crest substantially flush with the frusto-conical outer surface of the plug.

31. The valve as specified by claim 23, wherein the first mentioned screw thread is located on the larger end portion of the frusto-conical plug, and the second screw thread is located on the smaller end portion of said frusto-conical plug.

32. The valve as specified by claim 31, wherein the first mentioned screw thread has the crest thereof extended outwardly beyond the frusto-conical surface of the plug, and the second screw thread has the crest thereof substantially flush with the frusto-conical surface of the plug.

33. The valve as specified by claim 32, wherein the material of the sleeve in the region of contact with the second screw thread, is of increased density over the density of the sleeve material in the region of contact with the first mentioned screw thread.

34. The valve as specified by claim 21, wherein the hand of the screw thread is such as to increase the force of seating contact between the plug and the sleeve as the plug rotates toward a shut-off position at which the through passage of the plug is out of registry with the ports of the valve body member.

35. The valve as specified by claim 21, wherein the hand of the screw thread is such as to decrease the force of seating contact between the plug and the sleeve as the plug rotates toward a shut-off position at which the through passage of the plug is out of registry with the ports of the valve body member.

36. The valve as specified by claim 21, wherein the screw thread imparts to the plug an axial shifting thereof relative to the sleeve in the direction of the smaller diameter end of the plug, incident to rotation of the plug to de-register the through passage of the plug with respect to the ports of the valve body member.

37. The valve as specified by claim 21, wherein the screw thread imparts to the plug an axial shifting thereof relative to the sleeve in the direction of the larger diameter end of the plug, incident to rotation of the plug to de-register the through passage of the plug with respect to the ports of the valve body member.

38. The valve as specified by claim 21, wherein the annulus between the plug and the body member increases and decreases in size depending upon the direction of rotation of the plug.

39. The valve as specified by claim 21, wherein the annulus between the plug and the body member increases in size as the valve plug rotates in a direction to deregister the through passage of the plug with respect to the ports of the body member.

40. The valve as specified by claim 11, wherein the last-mentioned means performs simultaneously to retain the sleeve member axially and rotationally static with relation to the valve body member.

References Cited

UNITED STATES PATENTS

| | | | |
|---|---|---|---|
| 668,406 | 2/1901 | Holt | 251—317 |
| 2,864,580 | 12/1958 | Lemoine | 251—317 |
| 3,041,036 | 6/1962 | McFarland | 251—315 X |
| 3,044,493 | 7/1962 | Welty | 251—317 X |
| 3,152,205 | 10/1964 | Sinkler | 251—317 X |
| 3,199,835 | 8/1965 | Freed | 251—317 X |
| 2,767,729 | 10/1956 | Mueller | 251—283 X |
| 2,986,374 | 5/1961 | Rakus | 251—317 |
| 3,061,269 | 10/1962 | Sinkler | 251—317 |
| 3,066,909 | 12/1962 | Reed | 251—283 X |

FOREIGN PATENTS

| | | |
|---|---|---|
| 11,111 | 1/1934 | Australia. |
| 30,239 | 11/1911 | Great Britain. |

CLARENCE R. GORDON, Primary Examiner

U.S. Cl. X.R.

251—283, 288, 317, 368